May 11, 1926.
C. I. SCHROCK
WASHER DISTRIBUTOR
Filed Oct. 9, 1923    4 Sheets-Sheet 1
1,584,477
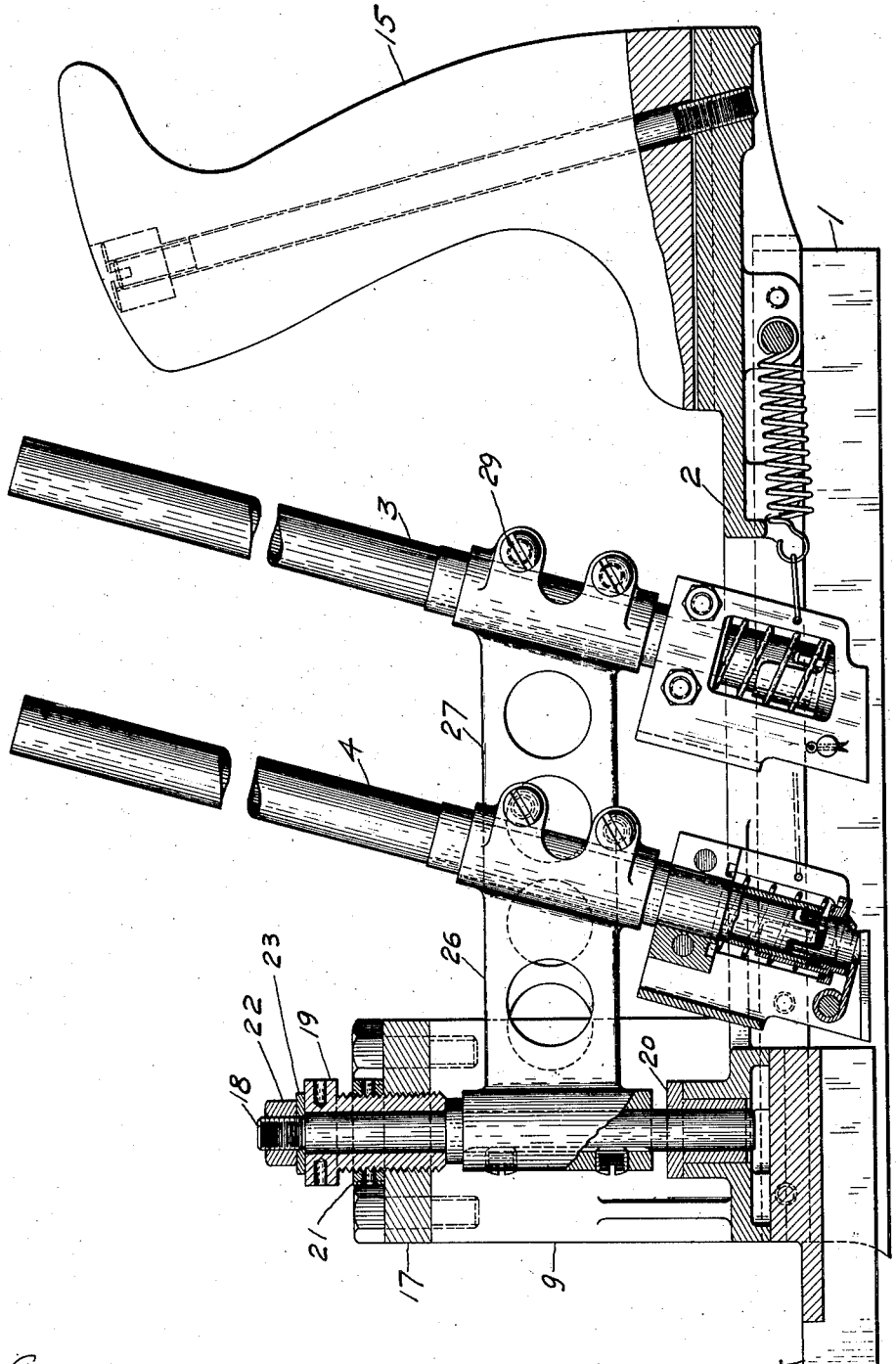
INVENTOR
CHARLES I. SCHROCK

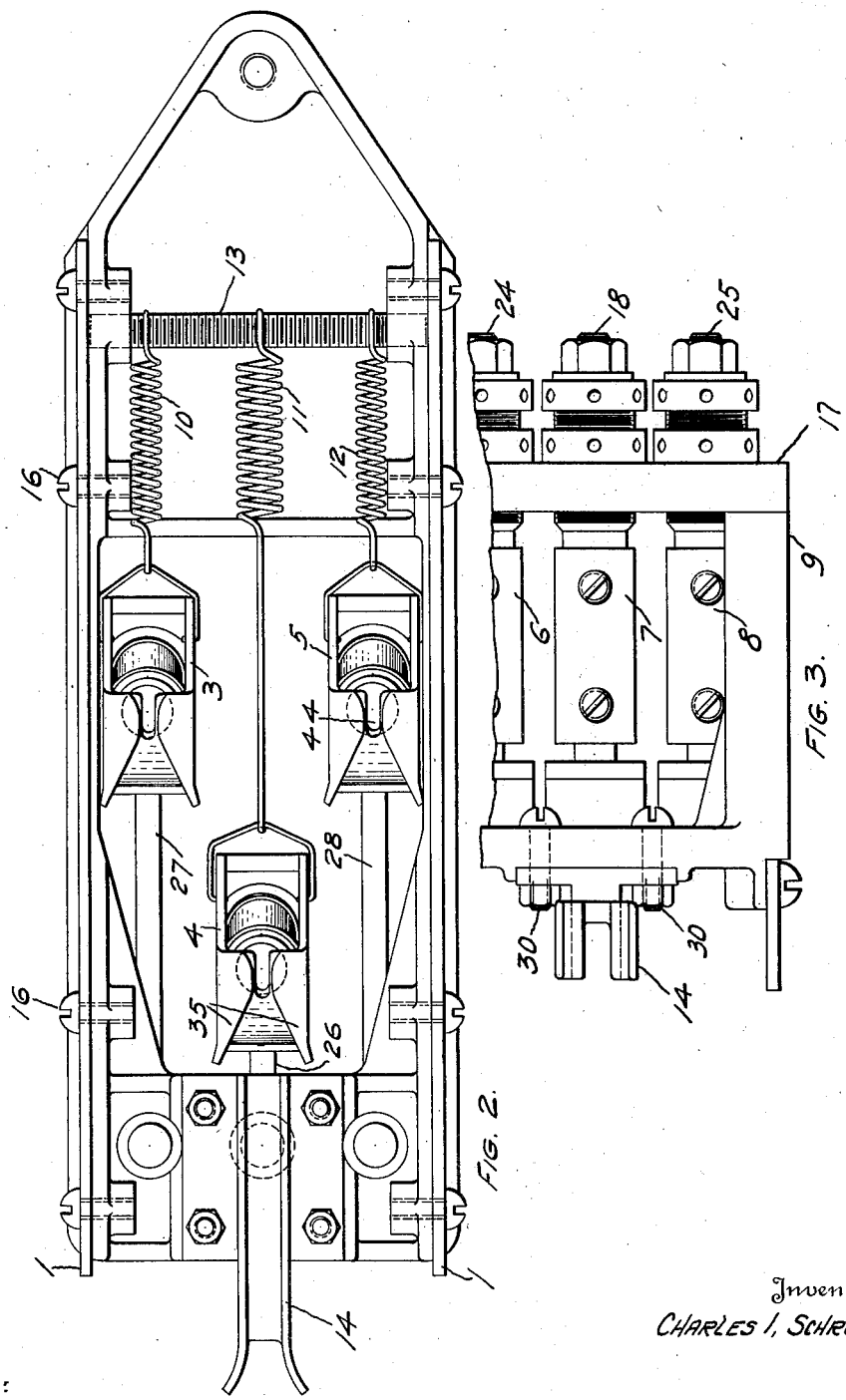

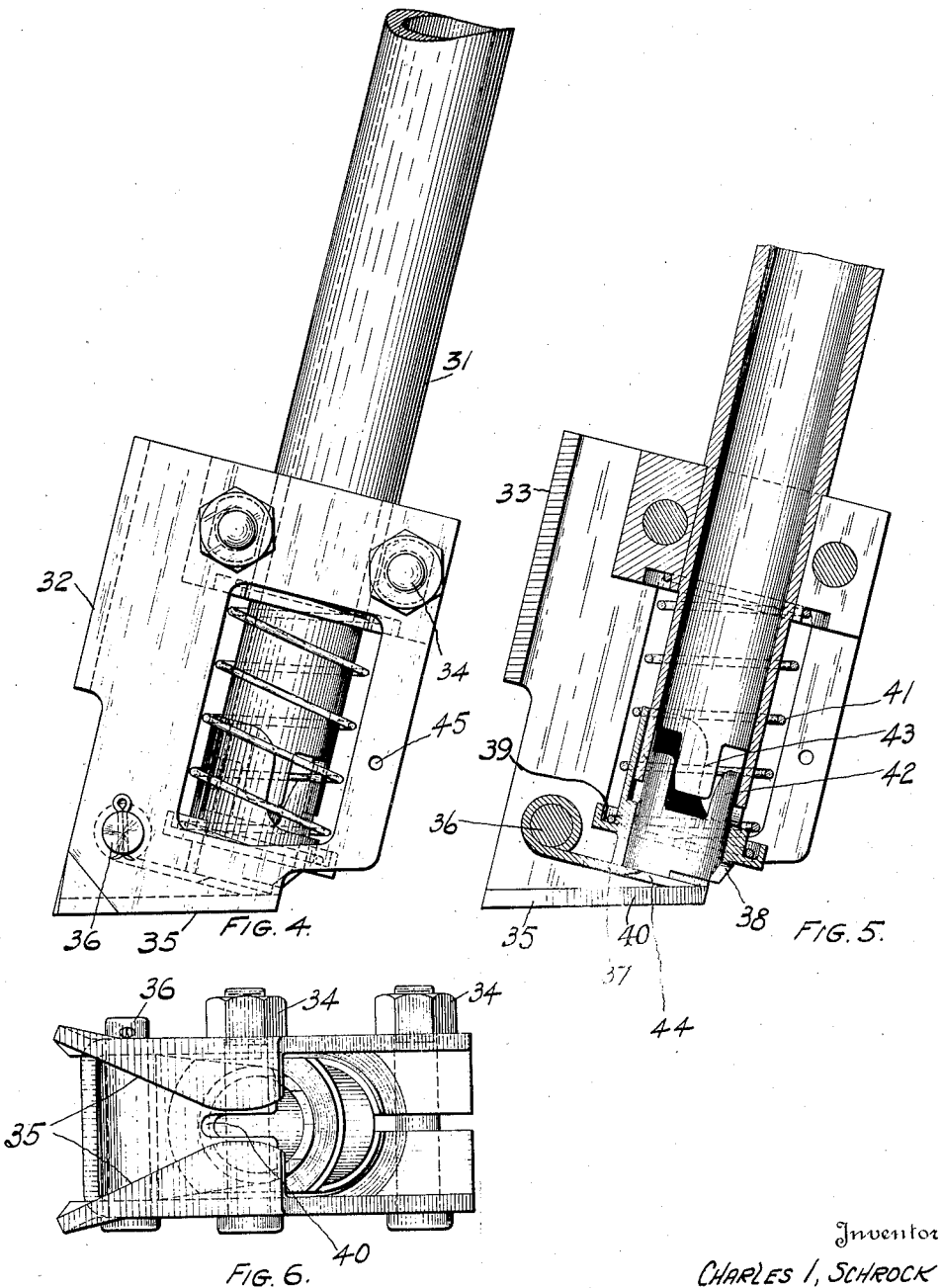

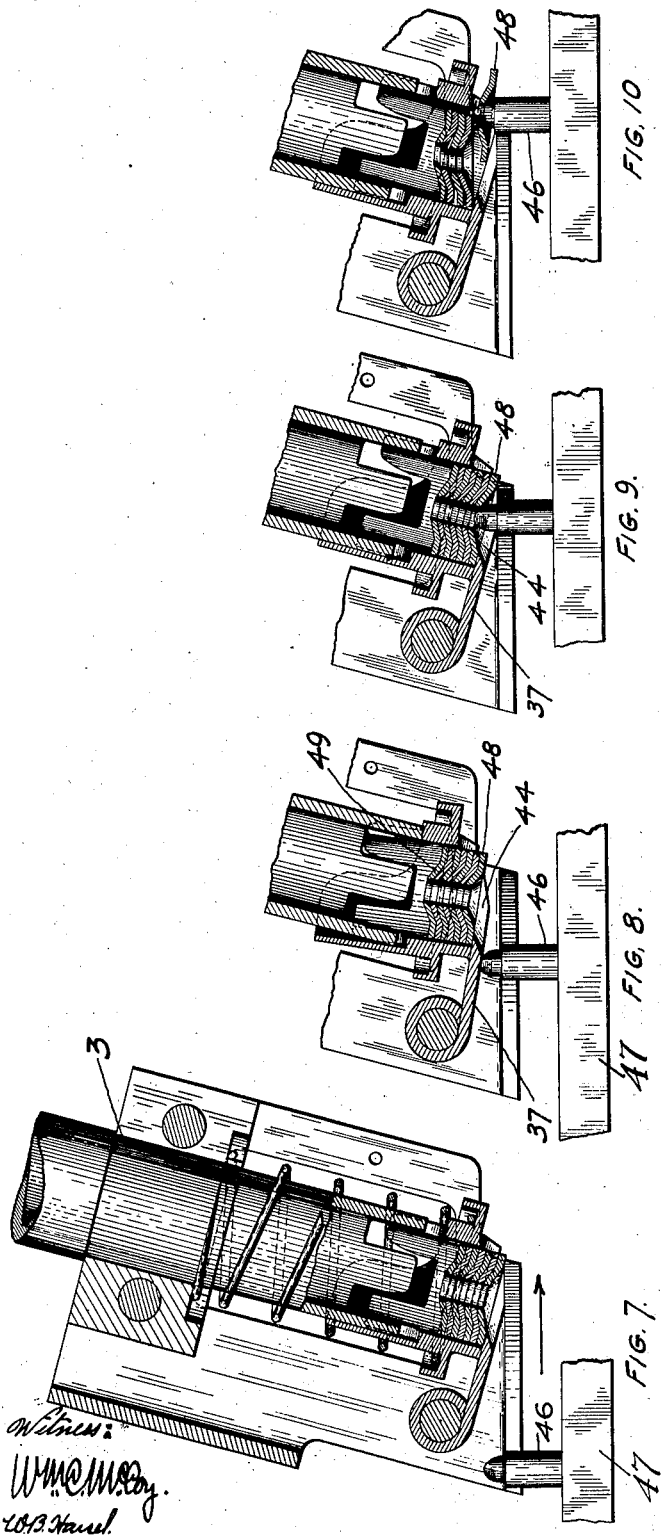

Patented May 11, 1926.

1,584,477

UNITED STATES PATENT OFFICE.

CHARLES I. SCHROCK, OF PASADENA, CALIFORNIA, ASSIGNOR TO THE GOODYEAR TIRE & RUBBER COMPANY, OF AKRON, OHIO, A CORPORATION OF OHIO.

WASHER DISTRIBUTOR.

Application filed October 9, 1923. Serial No. 667,564.

This invention relates to a machine for distributing washers to the pins of heel molds and the like and is an improvement of the washer distributing machine which forms the subject matter of my co-pending application Serial No. 667,565, filed October 9, 1923.

Molds for use in the manufacture of rubber heels and the like generally comprise a base plate that has a series of washer receiving pins extending upwardly from the surface thereof, and upon which washers are positioned for subsequent incorporation in the molded product.

This invention contemplates an improvement of my former device and provides a mechanism that will simultaneously position washers on a plurality of rows of such mold pins.

Fig. 1 of the accompanying drawings is a side elevational view, shown partially in section with parts broken away, of a washer distributing device constructed in accordance with my invention;

Fig. 2 is a bottom plan view of the device shown in Fig. 1;

Fig. 3 is a front end elevational view of the device shown in Fig. 1;

Fig. 4 is a detailed plan view of one of the washer distributing elements from the machine shown in Fig. 1;

Fig. 5 is a vertical sectional view of the device shown in Fig. 4;

Fig. 6 is a bottom plan view of a device shown in Fig. 4; and

Figs. 7, 8, 9 and 10 illustrate various phases in the operation of the washer distributing units illustrated in Fig. 4.

The machine illustrated in Fig. 1 comprises a plane that is supported on a pair of spaced runners 1, and that has a deck 2 on which a series of washer distributing units 3, 4 and 5 are respectively mounted on swingable arms 6, 7 and 8 that are held in a frame 9 that is formed integrally with the deck of the plane. A series of springs 10, 11 and 12 respectively extend from the washer distributing units 3, 4 and 5 to a corrugated spring supporting rod 13 which serves to resiliently align the respective distributing units with the direction of movement of the plane. A guide 14 aligns the plane with the principal line of pins and the various elements 3, 4 and 5 are so related that they simultaneously follow adjacent rows of pins.

A handle 15 is attached to the rear portion of the deck 2 of the plane for convenience in pushing the plane over the surface of the mold that is adapted to receive washers from the distributing plane. The lowermost edges of the runners 1 are parallel, and jointly serve to definitely space the deck 2 of the plane from the mold face and therefore to position each of the distributing units 3, 4 and 5, to operatively engage the mold pins. Each of the runners 1 is secured to the bed of the plane by means of a series of screws 16. The bracket 9, which constitutes a portion of the bed 2 of the plane, has a pair of uprights that are spanned by a yoke 17 on which a plurality of vertical pins 18 are rotatably mounted in adjustable sleeves 19. Each has a bearing 20 that is mounted in a suitable socket formed in the deck 2. The sleeve 19 is vertically adjustable in the yoke 17 by means of a threaded engagement therewith. A lock nut 21 serves to lock the sleeve 19 in any adjusted position.

The upper end of each of the pins 18 has a nut 22 and a washer 23 which serves as a bearing face for the pin.

Each of the arms 6, 7 and 8 has a clamping member 29 at its outer end in which the respective washer distributing units 3, 4 and 5 are mounted and by means of which the respective elements may be raised or lowered relative to the face of the mold.

The guide 14 that is secured to the front portion of the bed of the plane, is held in place by a plurality of bolts 30 that position it midway between the runners 1 of the plane.

Each of the distributing units 3, 4 and 5 is of substantially identical structure. One of the units is illustrated in detail in Figs. 4, 5 and 6 wherein the magazine portion 31 is illustrated as having an escapement device 32 mounted thereon. The escapement device 32 comprises a frame 33 that is rigidly connected to the magazine 31 by means of through bolts 34 which clamp the frame to a restricted portion of the magazine tube. The bottom portion of the frame has a pair of inwardly turned guide members 35 that together constitute a guide for directing the distributing device over the individual pins upon which a washer is to be placed. For this reason the guides 35 have a flared opening that is sufficiently large to engage any pin within the range of operation of its respective distributing unit.

The frame 32 also has a pivot pin 36 extending therethrough that supports a pivotally mounted member 37 that operates to release the washers one at a time through an aperture 38 that is formed therein. The member 37 comprises a sleeve that is rigidly attached to the base portion and that has a supplemental spring seat 39 rigidly connected therewith. The parts 37 and 39 are rigidly assembled units that are separately constructed for convenience of manufacture. A spring 41 resiliently holds the member 39 into contact with the trailing portion 40 of the guide 35. The distributor sleeve 37 and the magazine portion 31 respectively have a series of teeth 42 and 43 that cooperate to prevent dislodgment of washers from the stack that is supported within the magazine 31 during the operation of the device. A slot 44 is formed in the base portion of the distributor foot 37 of just sufficient width to admit the head of a mold pin, and terminates at a point somewhat within the outer rim of the washers contained in the magazine 31 in substantially the same manner as in the corresponding element of my aforementioned copending application. The opening 45 that is formed in the frame 32 serves as a means for anchoring the springs 10, 11 and 12, as the case may be, to the respective distributing device.

Additional structural details that are present in this form of washer distributing machine will be set forth during the description of the operation of the machine.

Referring particularly to Figs 7, 8, 9 and 10, the figures there shown represent a mold pin 46, that is rigidly mounted in a base plate 47, as moved across the sheet from left to right under the distributing device 3 in order to illustrate various phases of the operation of the distributing units.

The distributing device herein illustrated may either be moved over the series of mold pins, or the mold, together with the pins which it carries, may be moved under the distributing mechanism. For convenience of illustration, I have set forth the operation of my device by illustrating various phases in the movement of a mold pin underneath one of the distributing units.

The normal distances between the line of action of the distributors 3, 4 and 5 is approximately the same as the corresponding distance between the rows of mold pins. The distances between the distributors may be adjusted to the proper value by moving the springs 10 and 12 along the angle pin 13.

The pair of runners 1 position each of the distributing units 3, 4 and 5 a predetermined distance above the face of the mold. This distance is determined by the approximate length of the mold pins. As the mold moves underneath the distributing unit the guide 14 engages a series of pins and aligns the direction of relative movement of the distributing plane with the central line of pins that is to be supplied with washers.

As the respective members 3, 4 and 5 approach the respective pins of the series over which the member is being moved, the guides 35 of each of these devices engage the respective mold pins which swings the corresponding distributing member 3, 4 and 5 directly over the pin to which a washer is to be supplied. The pin is thereby directed to the slot 44 that is formed in the base portion of the distributor foot 37 as indicated in Figs. 8 and 9 of the drawings.

As the mold pin approaches the slot 44 it engages the pivotally mounted supporting foot 37 and raises the supporting foot a sufficient degree to enable it to pass over the top of the mold pin. The distributor foot 37 carries the mold pin beyond the approaching edge of the lowermost washer 48 of the stack 49 that is carried by the magazine of the distributor unit. When the mold pin passes the edge of the slot 44, the distributor foot 37 drops down over the head of the mold pin thereby dropping a washer over the head of the mold pin and enabling the mold pin to engage the approaching edge of the opening through the washer. This position is illustrated in Fig. 9 of the drawing. It will be noted that the mold pin is carried slightly beyond the approaching edge of the washer by the base portion 37 of the distributor foot before the washer is dropped with its cone shaped portion uppermost.

Further movement of the mold pin causes it to engage the edge of the washer and to drag the washer 48 laterally through the aperture 38 from the stack 49 thereby depositing it upon the corresponding mold pin 46.

It will be noted that in this operating sequence, the stack of washers is actually lifted and dropped over the top of the mold pin, thus insuring the absolute engagement of a washer with each mold pin, and therefore reliability in the operation of the device. Since the remaining portions of the stack of washers 49 is again lifted by this first slight movement of the lowermost washer 48 during its removal from the stack, the distribution of more than one washer to each mold pin is thereby precluded and, when the stack again drops to its normal position as illustrated in Fig. 7 of the drawings, the remaining washers are positively held in the magazine. The unintentional loss of washers upon the mold face is substantially precluded by the nested relation of the washers within the stack and by the resilient pressure of the distributor foot 37 upon the supporting portions 40 of the bracket 32. This pressure is utilized to prevent the escape of washers from this stack when straight washers without the conical form are used.

Although I have described a preferred embodiment of my invention, it obviously extends to other forms of distributing devices, and I desire therefore that only such limitations shall be imposed thereon as are indicated by the spirit and scope of the appended claims.

What I claim is:

1. In a device for applying washers to the pins of heel molds, a frame, a plurality of washer distributors mounted in the frame, and resilient means adapted to adjust the distance between the distributors, and to permit each distributor to align with a series of mold pins, whereby the device is adapted to operate on different molds having different distances between the pins.

2. In a device for applying washers to the pins of heel molds, a frame, brackets secured in the frame, and a washer distributing unit secured in each bracket and adjustable therein in a vertical direction with respect to the base of the frame, whereby the device is adapted to operate on molds having pins of different lengths.

3. In a device adapted to distribute washers to heel mold pins, a frame, a plurality of distributors mounted in the frame, and means permitting automatic adjustment of the distributors relative to the frame in a longitudinal direction and means permitting adjustment in a vertical direction, whereby the device may operate on molds having pins of variable lengths and distances between the pins.

4. A device for supplying washers to heel mold pins comprising a frame, a guide on the frame adapted to space the device from the face of the mold and to align the device with a series of pins, washer distributing units mounted in the frame and guides on the distributing units adapted to automatically adjust the length of the units upon contact with the mold pins.

5. A hand tool for supplying washers to heel mold pins comprising a frame, a guide in the frame adapted to align the tool with rows of pins, washer distributing units adjustably supported on the frame and a guide associated with each unit to align that unit with a single row of pins.

6. A device for supplying washers to heel mold pins, comprising a frame, rods mounted in the frame and adjustable means extending from each rod to secure a washer distributing unit in the frame.

7. In a device for supplying washers to heel mold pins, a frame, a plurality of pins rotatably mounted in the frame, washer distributing units supported by the pins, and means associated with the pins adapted to adjust the position of the units relative to the frame.

8. A hand tool for simultaneously applying washers to a plurality of heel mold pins comprising a frame, a grip handle mounted in one end of the frame, a bracket mounted at the opposite end of the frame and washer distributing units adjustably and yieldably mounted in the bracket.

In witness whereof, I have hereunto signed my name.

C. I. SCHROCK.